United States Patent [19]
Lewis, Jr.

[11] 3,797,160
[45] Mar. 19, 1974

[54] SELF FLUSHING LIVE BAIT CONTAINER FOR POWER BOATS

[76] Inventor: Edgar R. Lewis, Jr., 6690 S.W. 98 St., Miami, Fla. 33143

[22] Filed: Sept. 5, 1972

[21] Appl. No.: 286,616

[52] U.S. Cl. .................................................. 43/55
[51] Int. Cl. ............................................. A01k 97/04
[58] Field of Search ...................... 43/55, 56; 119/3

[56] References Cited
UNITED STATES PATENTS

| | | | |
|---|---|---|---|
| 3,315,403 | 4/1967 | Smith | 43/55 |
| 2,855,720 | 10/1958 | Allen | 43/55 |
| 2,151,225 | 3/1939 | Newton | 43/55 |
| 2,485,684 | 10/1949 | Aldredge, Sr. | 43/55 |
| 2,966,002 | 12/1960 | Hobson et al. | 43/55 |

*Primary Examiner*—James H. Czerwonky
*Attorney, Agent, or Firm*—Lloyd J. Andres

[57] ABSTRACT

This invention comprehends a container for holding live bait in near normal environment slidably secured to a power boat for manually lowering the container for natural circulation of water therethrough when the boat is not moving. The container may be manually raised above the water and is supplied with a flow of water by a manually controlled water scoop when the boat is underway. The water scoop is separately mounted, and is vertically movable by camming means.

3 Claims, 7 Drawing Figures

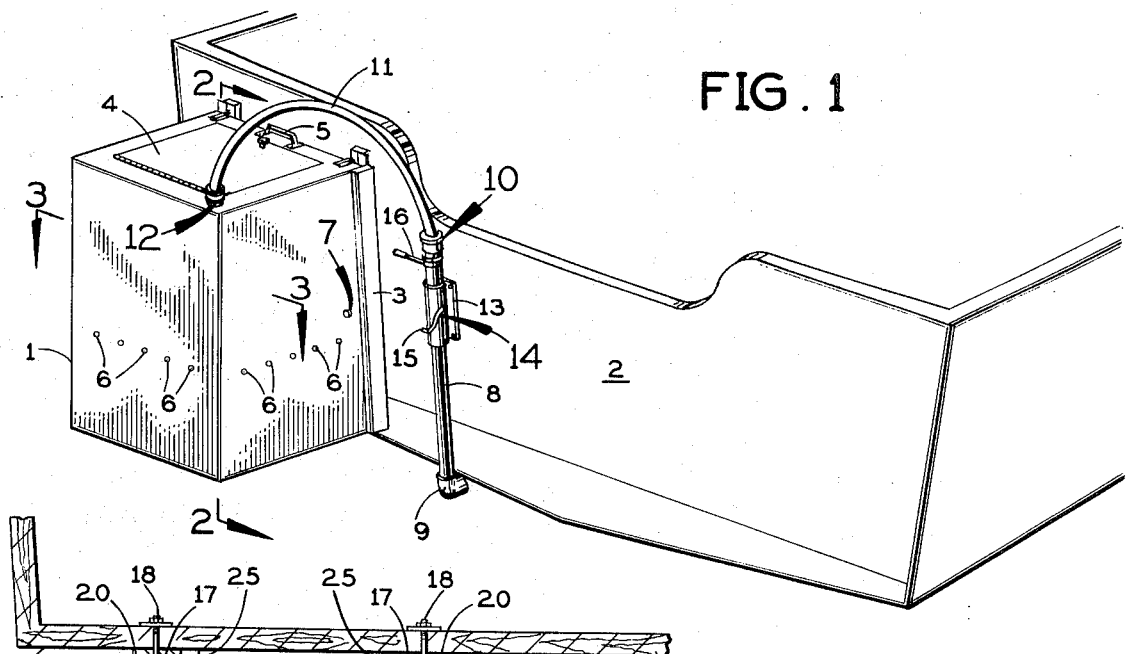
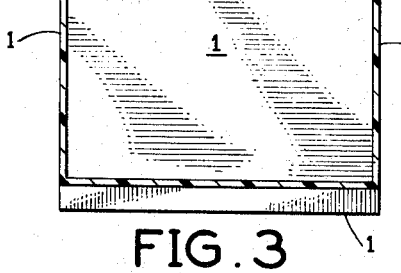
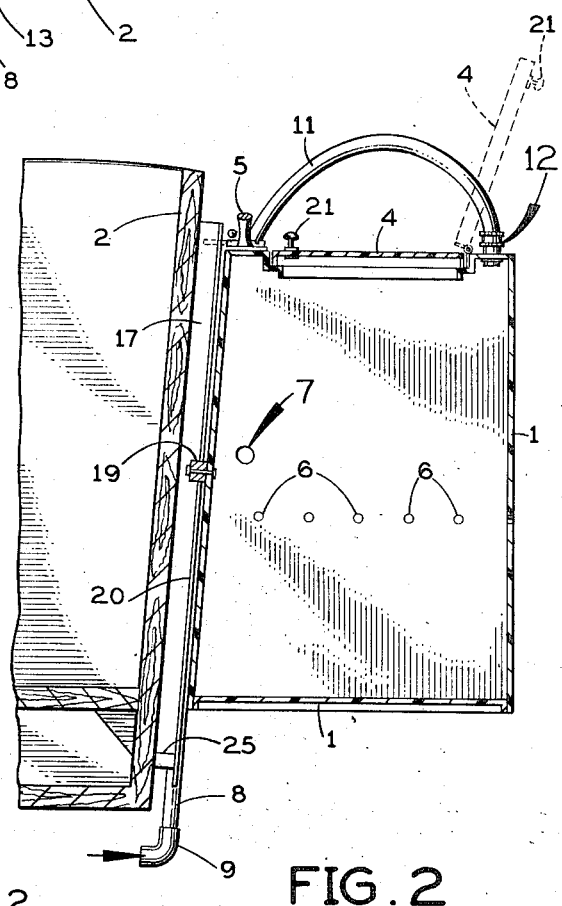
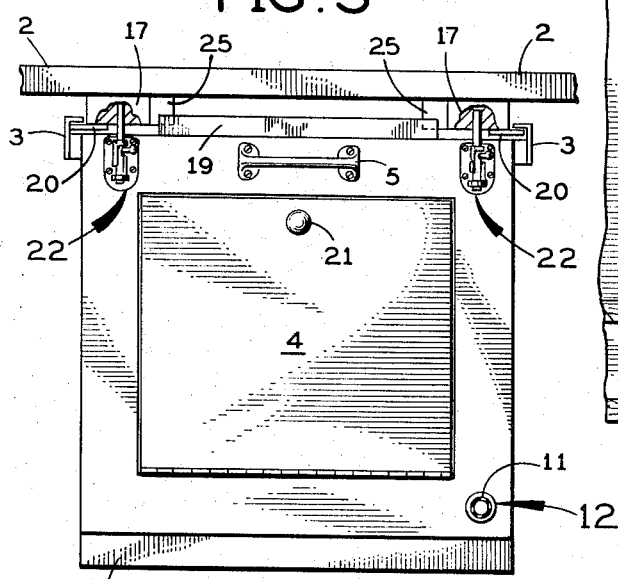

SELF FLUSHING LIVE BAIT CONTAINER FOR POWER BOATS

This invention relates in general to containers for live fishing bait which are secured to the transom of a power boat.

Prior bait boxes and containers are usually portable vessels in which the water is not interchanged and therefore the live bait rapidly succumbs due to lack of oxygen in the water. Furthermore, containers lowered over the side of a boat on a line are often forgotten and the entire container is lost when forcefully dragged through the water, or the bait contents lost because of the opening of the cover means.

The present invention overcomes the above objections and disadvantages by the provision of a container which is slidably mounted to the transom of a power boat with the lower portion thereof submergible in water below the bottom surface of the boat with provision for circulation through appropriate apertures through the container when the boat is at rest, which is a principal object of the invention.

Another object of the invention is the provision of a manual means for raising the container from the water and supplying adequate water circulation through the container by a manually controlled water scoop for supplying a flow of natural water through the container when the boat is motivated.

These and other objects and advantages in one embodiment of the invention are described and shown in the following specification and drawings, in which:

FIG. 1 is a perspective reduced scale view of a self flushing bait container attached to the transom of a power boat with nozzle for mobile flushing.

FIG. 2 is a cross sectional side elevation taken through section line 2—2, FIG. 1.

FIG. 3 is a cross sectional plan view taken through section line 3—3, FIG. 1.

FIG. 4 is an enlarged plan view of the bait container shown in FIG. 1 with portions thereof broken away.

Figure 5:
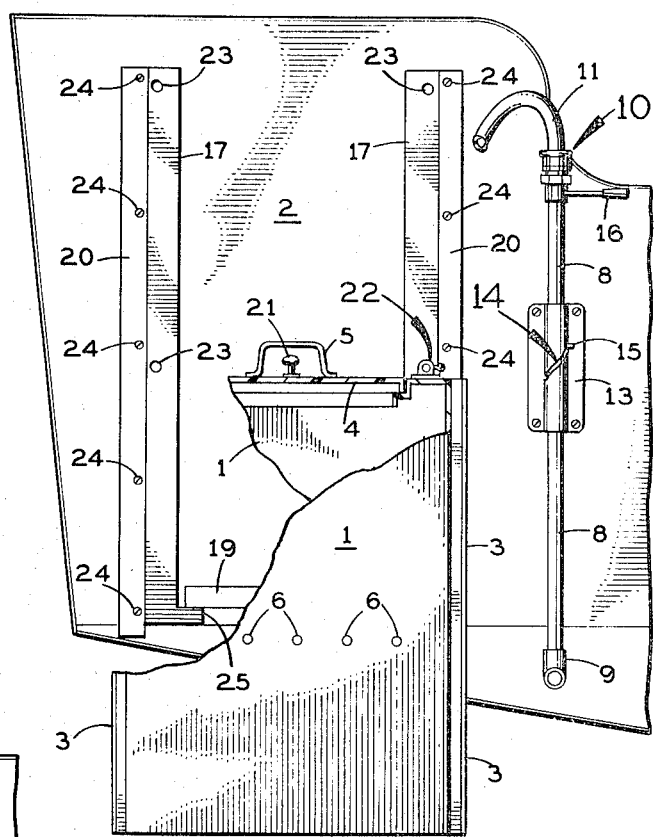
FIG. 5 illustrates the bait container shown in FIG. 1 in a partly submerged position with nozzle in non-functional position.

FIG. 1 shows the bait box 1 retained to one side area of transom 2 of a power boat by a pair of rail guides 3 secured and overhanging the right and left rear sides of the box. The box has an outwardly hinged top door 4 and a manual box lift handle 5 on the upper side thereof. A plurality of holes 6 in each of the sides of the box permit the water of self-circulate therethrough when the container is partly submerged into its lowered position and said boat is not power propelled. A drain hole 7 is provided to prevent the water from rising to an undesirable height within the box when power flushed with water when the boat is power propelled, as hereinafter described. A straight pipe or tube 8, of corrosion resistant material, has a right angle elbow-shaped scoop 9 at the lower end thereof and a pipe coupling assembly 10 at the upper end thereof for coupling a flexible hose 11 to an inlet assembly 12.

The tube is positioned for vertical slidable and rotary movement in a flanged tubular bearing support 13 secured to the transom by screw means for retaining the tube in vertical parallel relation to the transom.

A spiral shaped cam slot 14 through the tubular portion of support 13 is adapted to guide the tube by means of a stud 15 projecting therefrom in a predetermined vertical path while rotating 180° by a manual handle 16 projecting from the upper portion of the tube.

FIG. 3 shows a pair of parallel wood spacers 17—17 secured in vertical spaced relation to the transom by counter-sunk bolts 18 retained by suitable washers and nuts.

A horizontal stop bar 19 is secured transversely across the inner side of the box substantially midway of its height, the action of which will be hereinafter described. A flat metal rail 20 is secured by screw means along the outer surface of each spacer 17 and uniformly overhanging the outside edge thereof sufficiently to slideably engage longitudinal slots in each corresponding guide 3, which are secured along the inner marginal sides of the bait box 1.

FIG. 2 shows a knob 21 for opening a door 4 of the box or container and the stop bar 19 bolted to the rear center portion of the container for limiting the descent thereof when the boat is not motivated.

An arrow at scoop 9 in FIG. 2 illustrates the flow of water into and upward in tube 8 and through hose 11 into the container when the boat is motivated.

FIG. 4 shows a pair of sliding bolt assemblies 22 secured in each inner corner portion of the top of the container for engagement in matching holes 23 in spacers 17, better shown in FIG. 5.

FIG. 5 shows the rails 20 secured to spacers 17 by flat head screws 24. Each rail has an inward offset portion 25 which provides a stop abutment at each end portion of bar 19 to position the container for self water flow through the holes 6 in the container to preserve the bait. It is also apparent that when the box is moved to its highest out of water position each bolt assembly 22 may be manually engaged in each of the holes 23 in each spacer 17. When in the lower position, as shown in FIG. 5, each hole will be engaged by the bolt of assemblies 22 for securing the container in its lowered position with the cabinet holes 6 below the surface of the water for normal flushing when the boat is not motivated.

FIG. 5 also shows the tube 8 slidably retained in support 13 with a cam follower stud 15 which is engaged in a 180 degree spiral cam slot 14.

Figure 6:
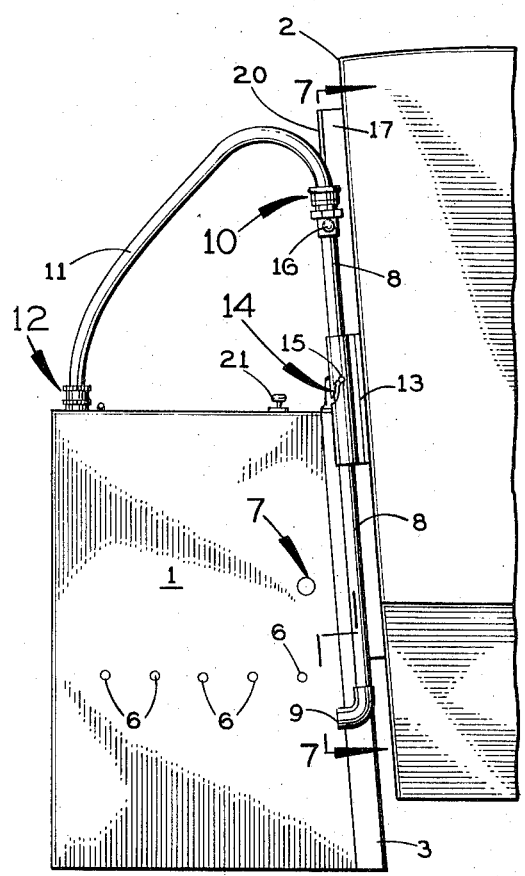
FIG. 6 is a side elevation of the container partly submerged as shown in FIG. 5.
Figure 7:
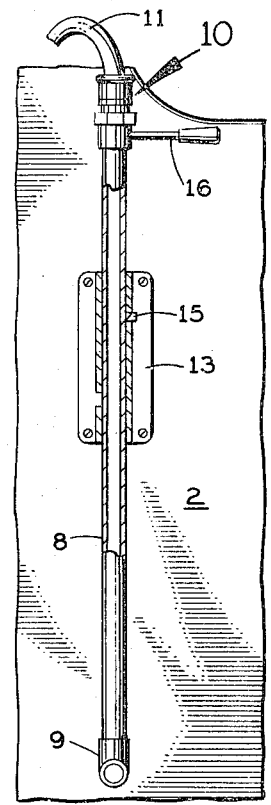
FIG. 7 shows the manual nozzle control elements along section line 7—7, FIG. 6.

FIGS. 5, 6, and 7 show the bait container in its lowered position for self flushing through the holes 6 with the control for power flushing shown in its inactive position with the handle 16 rotated in reverse position and FIG. 2 shows the container raised from its position below the hull of the boat by the manual rotation of the handle 16 a half revolution, moving the scoop 9 to its forward position in the water. It is apparent that the flow of water may be controlled by limiting the rotation of the pipe to correspond with the speed of the boat.

It is to be understood that certain modifications in construction are intended to come within the teachings and scope of the above specification.

Having described my invention, I claim:

1. An attachment for the transom of a boat for retaining live bait in normal water environment comprising means forming a container of predetermined dimensions with a door means for access through the top thereof, a plurality of spaced water circulation holes around said container a predetermined distance from the bottom thereof for the self circulation of water through said container when in its lower position and said boat is substantially immobile and normally floating in said water, said container slidably secured to the outer surface of the transom of said boat by a rail and follower means for movement of the container from a lowered position with a portion thereof submerged in water below the bottom surface of said boat to an upper position a predetermined distance above the bottom surface of said boat, a straight tube journalled in a bearing means secured to said transom for rotary and substantially vertical axial movement and said bearing means and said tube means having cooperative camming means for simultaneously raising and lowering said tube a predetermined distance when the latter is rotated in opposite directions respectively, the lower end of said tube terminating in a right angled elbow forming an open scoop, a flexible conduit connected at one end to the upper end of said tube and the opposite end thereof connected through the top of said container, a manual handle for the rotation of said tube to lower said nozzle from an inactive position above said bottom surface in said boat to a lower position below said bottom surface and facing forward of said boat whereby water will be forced upward through said tube by said scoop to flow through said conduit into said container continuously when the boat is motivated for supplying said container with a circulation of environmental water.

2. The construction recited in claim 1 including an over-flow hole through said container a predetermined distance above said circulation holes for maintaining the water at a desired level in said container when the latter is in said raised position and said boat is motivated.

3. The construction recited in claim 1 wherein said camming means comprises a helical slot in said bearing means slideably engaged by a stud projecting from said tube.

* * * * *